United States Patent
Kawano

(10) Patent No.: US 8,539,266 B2
(45) Date of Patent: Sep. 17, 2013

(54) ELECTRONIC DEVICE

(75) Inventor: Takeshi Kawano, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/523,168

(22) Filed: Jun. 14, 2012

(65) Prior Publication Data

US 2012/0254638 A1  Oct. 4, 2012

Related U.S. Application Data

(63) Continuation of application No. 13/252,514, filed on Oct. 4, 2011, now abandoned, which is a continuation of application No. 12/000,762, filed on Dec. 17, 2007, now abandoned.

(30) Foreign Application Priority Data

Dec. 25, 2006  (JP) .................................. 2006-347361

(51) Int. Cl.
*G06F 1/00* (2006.01)
(52) U.S. Cl.
USPC .......................................... 713/300; 710/104
(58) Field of Classification Search
USPC .................. 713/300; 710/300, 104
See application file for complete search history.

(56) References Cited

U.S. PATENT DOCUMENTS

| | | | |
|---|---|---|---|
| 4,310,791 A * | 1/1982 | Akamatsu ..................... | 318/800 |
| 6,072,304 A * | 6/2000 | Duve ........................... | 323/239 |
| 6,774,604 B2 | 8/2004 | Matsuda et al. | |
| 6,963,933 B2 | 11/2005 | Saito et al. | |
| 7,028,126 B1 * | 4/2006 | Liang ............................ | 710/301 |
| 7,343,147 B2 * | 3/2008 | Ruff et al. .................. | 455/343.1 |
| 7,356,715 B2 * | 4/2008 | Okayasu ....................... | 713/300 |
| 7,455,229 B2 * | 11/2008 | Tanaka ..................... | 235/462.01 |
| 7,514,821 B2 * | 4/2009 | Chen ............................ | 307/140 |
| 7,589,536 B2 * | 9/2009 | Terlizzi et al. ................ | 324/538 |
| 7,711,970 B2 * | 5/2010 | Keller ........................... | 713/323 |
| 7,863,906 B2 * | 1/2011 | Terlizzi et al. ................ | 324/538 |
| 8,035,368 B2 * | 10/2011 | May ............................. | 323/318 |
| 2005/0036034 A1 * | 2/2005 | Rea et al. .................... | 348/207.1 |
| 2007/0040894 A1 * | 2/2007 | Kikugawa ................... | 348/14.01 |
| 2007/0196099 A1 * | 8/2007 | Ishiyama et al. .............. | 396/301 |

(Continued)

FOREIGN PATENT DOCUMENTS

| | | |
|---|---|---|
| JP | A-2003-061256 | 2/2003 |
| JP | A-2004-094495 | 3/2004 |

(Continued)

OTHER PUBLICATIONS

Philips Semiconductors. USB On-The-Go: A Tutorial. Jan. 2002.*

(Continued)

*Primary Examiner* — Matthew D Spittle
(74) *Attorney, Agent, or Firm* — Oliff & Berridge, PLC

(57) ABSTRACT

A USB electronic device with a power source loaded therein, which is connected to another USB electronic device via a USB connector, comprises a voltage detection unit that detects a voltage at an identification pin of the USB connector, a power supply control unit that controls connection/disconnection between a power supply pin of the USB connector and the power source based upon a change in voltage at the identification pin detected by the voltage detection unit and an allow/disallow control unit that executes control to allow/disallow detection of the voltage change at the identification pin.

7 Claims, 2 Drawing Sheets

(56) References Cited

U.S. PATENT DOCUMENTS

2008/0150512 A1    6/2008  Kawano
2008/0265838 A1*  10/2008  Garg et al. .................... 320/115
2010/0244587 A1*   9/2010  Tiovola et al. ................ 307/130
2011/0099300 A1*   4/2011  Siulinski ........................ 710/19

FOREIGN PATENT DOCUMENTS

| JP | A-2005-025405 | 1/2005 |
| JP | A-2005-173820 | 6/2005 |
| JP | A-2006-018466 | 1/2006 |
| JP | A-2006-099354 | 4/2006 |

OTHER PUBLICATIONS

Hewlett-Packard Company et al. Universal Serial Bus 3.0 Specification. Revision 1.0. Nov. 12, 2008.*

Yarra, Srinivas. USB OTG software frees dual-role handheld devices. EDN Magazine. May 16, 2002.*

Stanley et al. On-The-Go Supplement to the USB 2.0 Specification. Revision 1.0. Dec. 18, 2001.*

May 31, 2011 Office Action issued in JP Application No. 2006-347361 (with English translation).

* cited by examiner

ELECTRONIC DEVICE

The disclosure of the following priority application is herein incorporated by reference: Japanese Patent Application No. 2006-347361 filed Dec. 25, 2006.

This is a Continuation of application No. 13/252,514 filed Oct. 4, 2011, which is a Continuation of application Ser. No. 12/000,762 filed Dec. 17, 2007. The disclosure of the prior applications is hereby incorporated by reference herein in their entirety.

BACKGROUND

1. Field of the Invention

The present invention relates to an electronic device connected through a USB (universal serial bus) interface.

2. Description of Related Art

The USB is known widely as an interface through which a personal computer and its peripheral devices are connected. A USB host equipped with a USB host controller and a USB device equipped with a USB device controller are typically connected through the USB interface. When the USB host and the USB device are connected with each other via the USB connection, power is normally supplied from the USB host to the USB device. However, there are technologies known in the related art that allow power to be supplied from the USB device to the USB host, as well (see, for instance, Japanese Laid Open Patent Publication No. 2005-25405).

SUMMARY

The USB device supplies power to the USB host in the related art by supplying power to a VBUS pin as the USB host becomes connected thereto lowering the voltage at an ID pin to a predetermined level. This gives rise to a concern that the USB device may supply power to a USB host connected thereto even if the USB host does not require power as the voltage at the ID pin becomes lowered to the predetermined level.

According to the first aspect of the present invention, a USB electronic device with a power source loaded therein, which is connected to another USB electronic device via a USB connector. The USB electronic device comprises voltage detection unit that detects a voltage at an identification pin of the USB connector, a power supply control unit that controls connection/disconnection between a power supply pin of the USB connector and the power source based upon a change in voltage at the identification pin detected by the voltage detection unit, and an allow/disallow control unit that executes control to allow/disallow detection of the voltage change at the identification pin.

The allow/disallow control unit includes a pull-up circuit and a switch that connects/disconnects the pull-up circuit to/from the identification pin, and the power supply control unit connects the pull-up circuit to the identification pin when the detection of the voltage change is allowed and disconnects the pull-up circuit from the identification pin when detection of the voltage change is disallowed by controlling changeover at the switch.

It is preferred that the USB electronic device comprises a setting operation unit with which a user selects a setting to allow/disallow the detection of a voltage change at the identification pin.

According to the second aspect of the present invention, a USB electronic device with a power source loaded therein, which is connected to another USB electronic device via a USB connector. The USB electronic device comprises a voltage detection unit that detects a voltage at an identification pin of the USB connector and power supply control unit that controls connection/disconnection between a power supply pin of the USB connector and the power source based upon a voltage change at the identification pin detected by the voltage detection unit. The power supply control unit includes a first switch disposed between the power supply pin and the power source, with which the power supply pin and the power source are connected with each other or disconnected from each other in response to a switching control signal and a second switch with which allow/disallow control is executed with regard to changeover at the first switch.

In the USB electronic device according to the second aspect of the present invention, when the changeover at the first switch is allowed via the second switch, the switching control signal is applied to the first switch via the second switch, whereas when the changeover at the first switch is disallowed via the second switch, the switching control signal is interrupted from the first switch by the second switch.

In the USB electronic device according to the second aspect of the present invention, the second switch is disposed between a switching control terminal of the first switch and the identification pin of the USB connector so as to connect/disconnect the switching control terminal of the first switch to/from the identification pin of the USB connector. The first switch is a semiconductor switching element and the switching control signal is applied to a switching control terminal of the semiconductor switching element, which is turned ON/OFF in correspondence to a voltage level at the identification pin. When the voltage level at the identification pin is low, the semiconductor switching element enters an ON state connecting the power supply pin to the power source.

It is preferred that the electronic device according to the second aspect of the present invention comprises an allow/disallow control unit that executes control to allow/disallow detection of a voltage change at the identification pin. In this case, the allow/disallow control unit is able to consists as well as an allow/disallow control unit comprised in a USB electronic device according to the first aspect of the present invention.

According to the third aspect of the present invention, a USB electronic device that includes a USB device controller and a power source loaded therein. The USB electronic device comprises a USB connector at which an electronic device equipped with a USB host controller is connected, a voltage detection unit that detects a voltage at an identification pin of the USB connector, a first switch that connects/disconnects a power supply pin of the USB connector to/from the power source, a detection unit that detects a voltage change at the identification pin detected via the voltage detection unit, a second switch disposed between a switching control terminal of the first switch and the identification pin, an allow/disallow control unit that executes control to allow/disallow detection of a voltage change by the detection unit, and a switching control unit that executes switching control for the second switch so as to connect the identification pin to the switching control terminal of the first switch when the detection of the voltage change by the detection unit is allowed by the allow/disallow control unit and the voltage change is detected by the detection unit.

The USB electronic device according to the third aspect of the present invention is still able to comprise a setting operation unit with which a user selects a setting to allow/disallow the detection of a voltage change at the identification pin. The allow/disallow control unit in the USB electronic device according to the third aspect of the present invention includes a pull-up circuit and a switch that connects/disconnects the pull-up circuit to/from an identification pin and the switch connects the pull-up circuit to the identification pin when a setting for allowing detection of a voltage change is selected via the setting operation unit and disconnects the pull-up circuit from the identification pin when detection of the voltage change is disallowed.

DETAILED DESCRIPTION OF EMBODIMENTS

The following is an explanation of the best embodiment of the invention given in reference to the drawings.

First Embodiment

Figure 1:
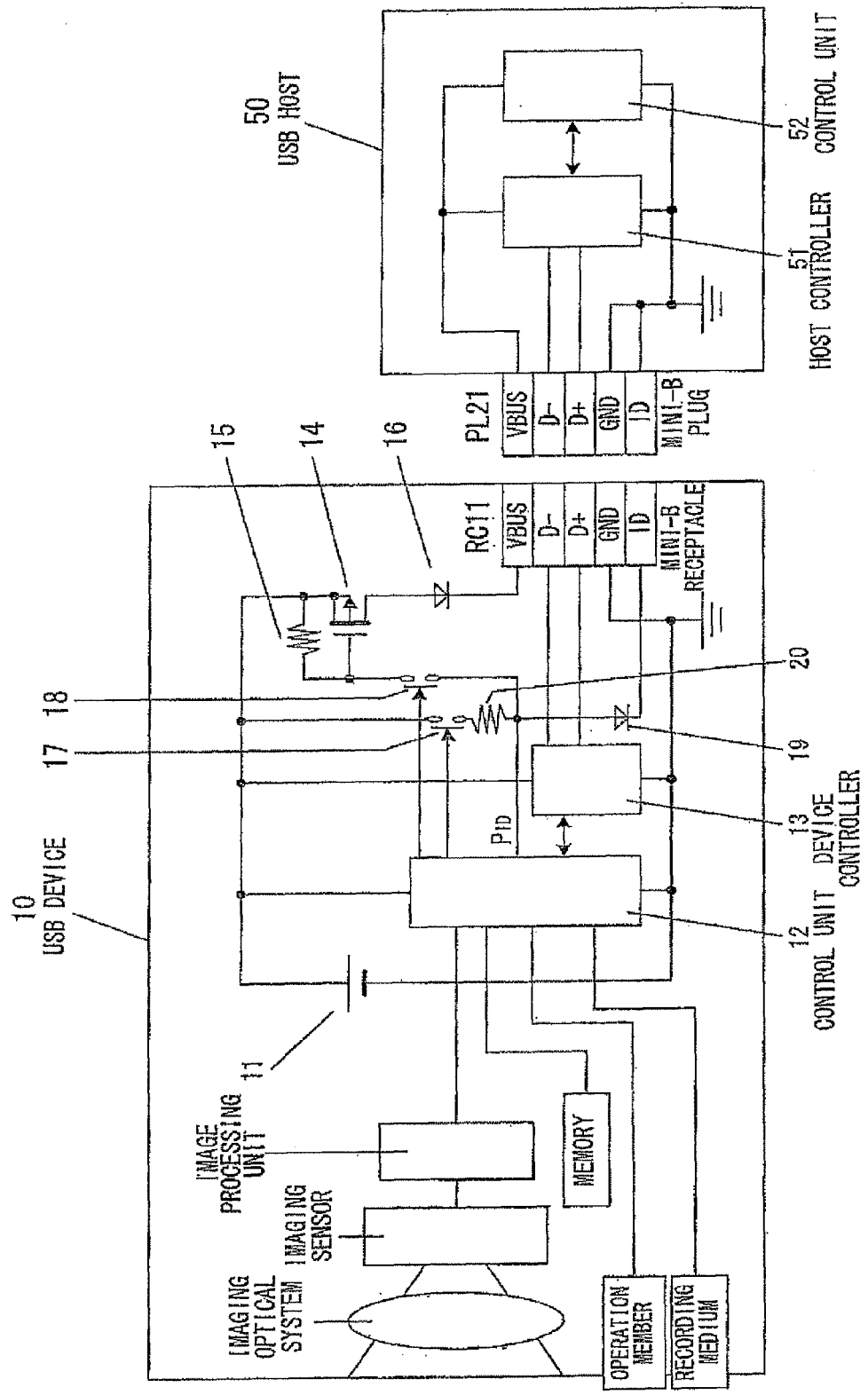
FIG. 1 illustrates the interface system achieved in an embodiment of the present invention.

FIG. 1 illustrates the interface system achieved in the first embodiment of the present invention. The interface system shown in FIG. 1 is constituted with a plurality of electronic devices connected with each other through a USB connection. The USB connection is achieved in compliance with the USB (universal serial bus) specification which is set forth by the USB Implementers Forum (USB-IF) A USB device 10 and a USB host 50 in the interface system achieved in the embodiment are directly connected with each other through a connector RC 11 and a connector PL 2 without a cable, with power supplied from the USB device 10 to the USB host 50. It is to be noted that in the description of the embodiment, the connector RC 11 and the connector PL 2 may be otherwise referred to as USB connectors.

The USB device 10 may be, for instance, an electronic camera, whereas the USB host 50 may be a wireless LAN module. By directly connecting the wireless LAN module 50 to the electronic camera 10 via the USB connectors, image data accumulated in the electronic camera 10 can be directly transferred to a server or the like on a network without having to transmit the image data via a personal computer or the like.

The USB interface comprises a power source VBUS line, a data D+ line, a data D− line, a reference potential GND line and an ID line. The ID line is used to identify a dual-role device as a "USB host" or a "USB device". A dual role device is a device that operates in compliance with the USB-OTG specification (On-The-Go Supplement to the USB 2.0 Specification) and may be determined to be operating as a "USB host" or as a "USB device" depending upon the voltage level detected at the ID line.

The power supply between devices connected through a USB connection is executed through the VBUS line. In addition, the devices connected through the USB connection communicate with each other through serial communication via a pair of data lines, i.e. the D+ line and the D− line.

The USB device 10 in FIG. 1 includes a control unit 12, a device controller 13, a semiconductor switching element (hereafter referred to as an FET) 14 such as a field effect transistor, resistors 15 and 20, diodes 16 and 19, analog switches 17 and 18 and the connector RC 11 mentioned earlier, with a battery 11 loaded therein. It is to be noted that no explanation of members including the members engaged in photographing processing in the camera, such as an imaging optical system, an imaging sensor, a image processing unit, a memory, a operation member, a recording medium and the like of the USB device 10 is provided in this specification.

Power is supplied from the battery 11 to the various components and elements constituting the USB device 10, such as the control unit 12 and the device controller 13. The control unit 12 includes a microcomputer and controls the operations of the various components and elements in the USB device 10 (an electronic camera in this example). In response to an instruction from the control unit 12, the device controller 13 executes control so as to enable the USB device 10 to operate as the "USB device". Data communication between the USB device 10 and the USB host 50 is controlled by a host controller 51 to be detailed later. The USB interface is configured so that the USB device 10 cannot transmit data to the USB host 50 unless the USB host 50 grants a bus utilization authorization to the USB device 10.

The analog switch 18 is disposed between a gate terminal of the FET 14 and an identification pin ID of the connector RC 11 and its ON/OFF state is controlled based upon a switching control signal provided by the control unit 12. More specifically, the analog switch 18 enters an ON state when the logic level of the switching control signal is at H and enters an OFF state when the logic level of the switching control signal is at L.

The ON/OFF state of the FET 14 is controlled based upon the state selected for the analog switch 18 and the voltage level at the ID line. In more specific terms, the FET 14 enters an ON state when the analog switch 18 is in the ON state and the voltage at the ID line is equal to or less than a predetermined voltage level. If the analog switch 18 is in the OFF state, the FET 14 assumes the OFF state as well. In addition, even if the analog switch 18 is in the ON state, the FET 14 assumes the OFF state if the voltage at the ID line is higher than the predetermined voltage level. As the FET 14 enters the ON state, the battery 11 becomes connected to a VBUS pin of the connector RC 11 via the FET 14 and the diodes 16. The diode 16 is disposed for purposes of reverse current prevention, whereas the resistor 15 is disposed to set the potential at the gate terminal of the FET 14 to a predetermined potential level.

It is to be noted that another type of switching element such as an analog switch or a relay may be used in place of the FET 14.

The ON/OFF state of the analog switch 17 is controlled based upon a switching control signal provided by the control unit 12. More specifically, the analog switch 17 enters an ON state when the logic level of the switching control signal is at H and enters an OFF state when the logic level of the switching control signal is at L.

The user of the USB device 10 selects a setting allowing the use of a wireless LAN module through, for instance, a menu operation performed by using the operation member. The control unit 12 at the USB device 10 turns on the analog switch 17 as the wireless LAN module use setting is selected, but the control unit 12 sustains the analog switch 17 in the OFF state until the wireless LAN module use setting is selected.

The control unit 12 includes a detection port $P_{ID}$ used to detect the voltage level at the ID line. As the analog switch 17 is turned on, the ID line becomes connected with the positive pole of the battery 11 via the resistor 20, and thus becomes pulled up. Namely, when the connector RC 11 is in an open state, the level of the voltage at the ID line indicates a voltage value higher than a predetermined voltage. Thus, when the wireless LAN module use setting is selected, the voltage at the ID line shifts from high level to low level as another device becomes connected to the USB device 10 via the connector RC 11 and the ID line becomes connected with the GND line via the other device, enabling the control unit 12 to detect the connection with the other device by reading the signal of the change in voltage at the detection port $P_{ID}$.

When the wireless LAN module use setting is not selected, the analog switch 17 does not enter the ON state and thus, the ID line does not become connected to the battery 11 via the resistor 20 leaving the level of the voltage at the ID line in an indeterminate state while the connector RC 11 is in the open state. Under these circumstances, even if another device becomes connected to the USB device 10 via the connector RC 11 and the ID line becomes connected to the GND line via the other device, the control unit 12 is not able to detect a reduction in the voltage level at the ID line. It is to be noted that the diode 19 is disposed for purposes of preventing a reverse flow of current at the ID line.

The connector RC 11 is a Mini B-type receptacle (Mini-B receptacle). The Mini B-type receptacle is a connector dedicated to the "USB device". A Mini B-type plug (Mini-B plug) at the "USB host" or a "USB cable" can be plugged into the connector RC 11. In the embodiment, the Mini B-type plug (Mini-B plug) at the USB host 50 is connected to the connector RC 11. The connector RC 11 includes a VBUS pin corresponding to the VBUS line, a D+ pin corresponding to the D+ line, a D− pin corresponding to the D− line, a GND pin corresponding to the GND line and an ID pin corresponding to the ID line.

The USB host 50 includes a control unit 52, the host controller 51 and the connector PL 21. It is to be noted that the figure does not include an illustration of the components and elements engaged in wireless communication processing in the USB host 50. The USB host 50 does not have a power source and instead, it receives power supplied from the USB device 10 and delivers it to the host controller 51 and the control unit 52.

The control unit 52 includes a microcomputer and controls the operations of the various components and elements in the USB host 50 (a wireless LAN module in this example). In response to an instruction from the control unit 52, the host controller 51 executes control so as to enable the USB host 50 to operate as the "USB host". Any processing via the bus is invariably triggered by the USB host 50 under control executed by the host controller 51.

The connector PL 21 is a Mini B-type plug (Mini-B plug). The A Mini B-type plug is a connector dedicated to the "USB host". The Mini B-type receptacle (Mini-B receptacle) at the "USB device" i.e., the connector RC 11, is connected to the connector PL 21. The connector PL 21 includes a VBUS pin corresponding to the VBUS line, a D+ pin corresponding to the D+ line, a D− pin corresponding to the D− line, a GND pin corresponding to the GND line and an ID pin corresponding to the ID line. It is to be noted that the GND pin and the ID pin are connected with each other within the USB host 50.

Power is supplied from the USB device 10 to the USB host 50 through the following procedure.

First, the USB device 10 and the USB host 50 become connected with each other via the connector RC 11 and the connector PL 21. The wireless LAN module use setting is selected at the USB device 10 through a menu operation performed by using, for instance, the operation member. Once the use of the wireless LAN module is allowed, the control unit 12 at the USB device 10 sets the logic level of the switching control signal output to the analog switch 17 to H, thereby turning on the analog switch 17. As the analog switch 17 is turned on, the detection port $P_{ID}$ of the control unit 12 becomes connected to the power source via the resistor 20 and thus becomes pulled up. As a result, the control unit 12 becomes able (is allowed) to detect the reduction in the voltage level at the ID line.

In the wireless LAN module use allowed state achieved as described above, the control unit 12 of the USB device 10 switches the logic level of the switching control signal output to the analog switch 18 to H, thereby turning on the analog switch 18, as the control unit 12 detects a reduction in the voltage at the detection port $P_{ID}$, i.e., a reduction in the voltage level at the ID line. As the analog switch 18 is turned on, the ID line where the voltage level has become lower is connected to the gate terminal of the FET 14, thereby turning on the FET 14, which, in turn, allows the power from the battery 11 to be supplied from the USB device 10 to the USB host 50 through the VBUS line.

When the use of the wireless LAN module is not allowed, the control unit 12 of the USB device 10 switches the logic level of the switching control signal output to the analog switch 17 to L, thereby turning off the analog switch 17. In addition, when the control unit 12 does not detect a reduction in the voltage at the ID line, it switches the logic level of the switching control signal output to the analog switch 18 to L, thereby turning off the analog switch 18.

The following advantages are achieved in the interface system in the embodiment described above.

(1) The interface system in the first embodiment is configured so that while the USB device 10 and the USB host 50 are connected with each other via the USB connectors, power can be supplied from the USB device 10 to the USB host 50 through the VBUS line in correspondence to the voltage detected at the ID line. The USB device 10 includes the analog switch 17 through which detection of a change in voltage level at the ID line by the control unit 12 is allowed or disallowed. Thus, as long as the detection of voltage level change at the ID line is disallowed, a USB device 10 adopting the failsafe structure does not detect a voltage reduction even when an unexpected device becomes connected to the USB device 10 and the voltage at the ID line becomes lower.

(2) When the analog switch 17 is in the ON state, the ID line is connected through a pull-up connection to the power source (battery 11) via the resistor 20. When the analog switch 17 is in the OFF state, however, the ID line is not connected to the power source through the pull-up connection. Consequently, when the detection is not allowed, the ID line, at which the voltage level is neither H level nor L level, can be set to a high impedance state.

(3) In addition, the USB device 10 in the interface system achieved in the first embodiment includes the FET 14 through which the power line connecting the power source (battery 11) with the VBUS line is turned ON/OFF and the analog switch 18 through which an ON/OFF changeover at the FET 14 is allowed/disallowed. As a result, as long as the changeover is disallowed, the USB device adopting the failsafe structure does not allow the FET 14 to enter the ON state even if the voltage at the ID line becomes lower.

(4) The switching control signal for the FET 14 is input to the gate terminal of the FET 14 when the analog switch 18 is in the ON state but the switching control signal is not input when the analog switch 18 is in the OFF state. As a result, as long as the changeover at the FET 14 is disallowed, the FET 14 is never turned on and thus, the power supply via the VBUS line is disabled with a high level of reliability regardless of what type of switching control signal is generated.

(5) The analog switch 18 is switched on only after the analog switch 17 first enters the ON state and thus, the FET 14 never enters the ON state unless a voltage reduction is detected at the ID line.

(6) When the analog switch 18 is in the OFF state, the FET 14, too, invariably assumes the OFF state. Namely, the FET 14 is a P-type FET which enters the ON state as the gate terminal becomes grounded. Consequently, whenever power should not be supplied from the USB device 10 to the USB host 50, the power supply can be reliably stopped.

(7) Power can be supplied from the USB device 10 to the USB host 50 without having to constitute the USB device 10 as a dual role device, i.e., without having to install a controller or software in compliance with the USB-OTG specification in the USB device. As a result, an inexpensive interface system is realized.

Second Embodiment

Figure 2:
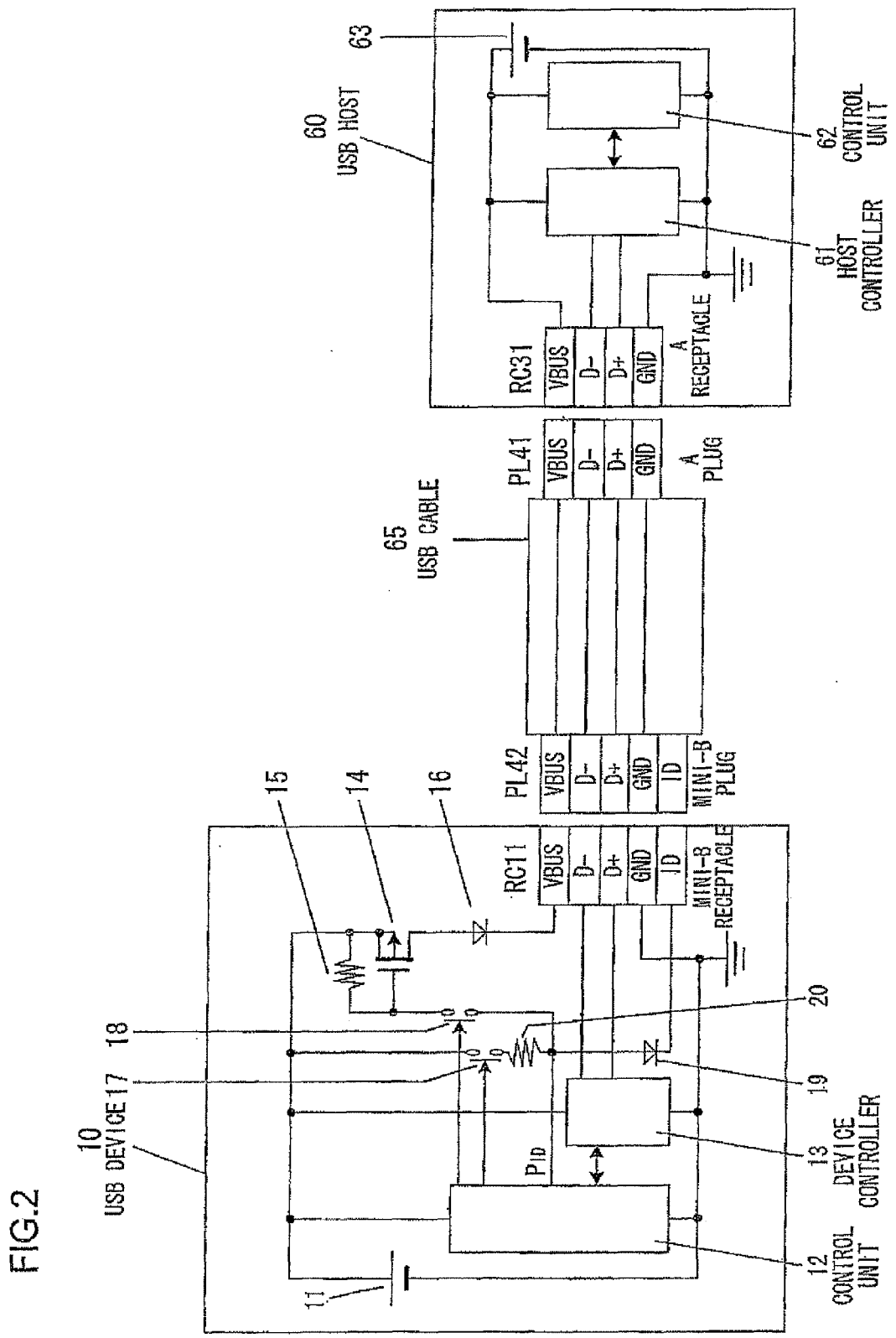
FIG. 2 illustrates how a USB host adopting a structure different from that of the USB host in FIG. 1 may be connected.

FIG. 2 illustrates the interface system achieved in the second embodiment of the present invention with a USB host 60 different from that shown in FIG. 1 connected therein. The USB device 10 and the USB host 60 in FIG. 2 are connected with each other via a USB cable 65. As in the first embodiment, the USB device 10 may be constituted with an electronic camera and the USB host 60 may be constituted with a wireless LAN module in the example presented in FIG. 2. The USB host 60 in the second embodiment has a function of supplying power to the USB device 10.

Since the USB device 10 is similar to that shown in FIG. 1, its explanation is omitted. It is to be noted that FIG. 2 does not provide an illustration of the individual components, elements and the like engaged in the photographing processing executed in the camera. The USB cable 65 is a directional cable. A connector PL 42 disposed at one end of the USB cable 65 is a Mini-B type plug (Mini-B plug). The Mini-B plug is a connector used to the "USB device". The RC connector RC 11 of the "USB device", i.e., the Mini-B type receptacle (Mini-B receptacle) is connected to the connector PL 42.

A connector PL 41, disposed at the other end of the USB cable 65, is an A-type plug (A plug). The A-type plug is a connector to the "USB host". A connector RC 31 of the "USB host", i.e., an A-type receptacle (A receptacle) is connected to the connector PL 41. Since the connectors disposed at the two ends of the USB cable 65 assume different shapes, two "USB hosts" or two "USB devices" are never connected with each other by mistake.

The connector PL 41 is a full-size connector with four pins. The connector PL 42 is a Mini-type connector as explained earlier and includes five pins. Since the connector PL 41 does not include an ID pin, the USB cable 65 does not include a wiring for ID pin connection and the ID pin of the connector PL 42 is left open-circuited.

The USB host 60 includes a control unit 62, a host controller 61 and the connector RC 31 (A-type receptacle), with a battery 63 loaded therein. It is to be noted that an illustration of the components, elements and the like in the USB host 60 engaged in wireless communication processing is not provided. The USB host 60 supplies power from the battery 63 to the host controller 61 and the control unit 62.

The control unit 62 includes a microcomputer and controls the operations of the individual components, elements and the like in the USB host 60. In response to an instruction from the control unit 62, the host controller 61 executes control so as to enable the USB host 60 to operate as the "USB host". Any processing via the bus is invariably triggered by the USB host 60 under control executed by the host controller 61.

The connector RC 31 is an A-type receptacle (A-receptacle). The A-receptacle is a connector dedicated to the "USB host". The connector PL 41 (A plug) of the USB cable 65 is connected to the connector RC 31. The connector RC 31 includes a VBUS pin corresponding to the VBUS line, a D+ pin corresponding to the D+ line, a D− pin corresponding to the D− line and a GND pin corresponding to the GND line.

The USB device 10 constituting the interface system shown in FIG. 2 is able to engage in operation on the power provided therein (from the battery 11) without having to rely on power supplied from the "USB host" via the VBUS line.

The operational procedure adopted in the interface system achieved in the second embodiment is now explained.

As in the first embodiment, the wireless LAN module 60 becomes connected to the USB device 10 via the USB cable 65. From the menu screen at the USB device 10, the wireless LAN module use setting or the wireless LAN module nonuse setting is selected. At the USB device 10, the wireless LAN module nonuse setting is selected as the default setting. When the wireless LAN module nonuse setting is selected, the control unit 12 sets the analog switch 17 in the OFF state and thus, the FET 14 remains off with no power from the battery 11 in the USB device 10 supplied to the VBUS. As a result, even when the wireless LAN module 60 with the battery 63 loaded therein is connected with the USB device 10, i.e., even when the battery 63 is connected to the VBUS pin of the connector RC 11 of the USB device 10, power source interference between the batteries 11 and 63 does not occur.

As the wireless LAN module use setting is selected in the menu screen, the analog switch 17 is turned on pulling up the detection port $P_{ID}$ and enabling the control unit 12 to detect a voltage change at the voltage detection port $P_{ID}$. In the interface system achieved in the second embodiment, the other end of the ID line at the USB cable 65 is open-circuited and the voltage at the voltage detection port $P_{ID}$ in the control unit 12 remains unchanged regardless of whether the USB host 60 is connected or disconnected. Consequently, the FET 14 sustains the OFF state, preventing the power source interference between the batteries 11 and 63.

(Variation 1)

One of or both of the analog switches 17 and 18 may be constituted with a mechanical switch. In such a case, the mechanical switch is turned on when the user allows to use the wireless LAN module with the USB device 10. If, on the other hand, the user disallows use of the wireless LAN module with the USB device 10, the mechanical switch is turned off.

(Variation 2)

Instead of using a signal input from the outside of the USB device 10 through the ID pin as the switching control signal to be input to the gate terminal of the FET 14, the switching control signal may be generated in the control unit 12. In such a case, upon detecting a reduction in the voltage level at the ID line applied from the outside of the USB device 10, the control unit 12 outputs a signal of L level as the switching control signal to be input to the gate terminal of the FET 14. In addition, if a reduction in the voltage level at the ID line is not detected, the control unit 12 outputs a signal of H level as the switching control signal for the FET 14.

(Variation 3)

While an explanation is given above on an example in which the USB device includes both the switch 17 and the switch 18, the USB device may instead include either of the switches 17 or 18.

(Variation 4)

In the interface system achieved in the first embodiment, power is supplied from the USB device 10 with the battery 11 loaded therein to the USB host 50 into which a battery cannot be loaded. However, the present invention may instead be adopted in an interface system in which power is supplied from a USB host with a battery loaded therein to a USB device into which a battery cannot be loaded. In the latter case, the interface system should adopt a structure that allows power to be supplied through the VBUS line from the USB host to the USB device in correspondence to the voltage at the ID line.

While an explanation is given above on an example in which the USB device 10 is constituted with an electronic camera, the present invention is not limited to this example and it may be adopted in conjunction with a USB device constituted with a portable electronic device such as a portable telephone or a FDA.

While the USB host 50 in the description provided above is a wireless LAN module, the present invention may be adopted in conjunction with a USB host constituted with a tuner module, a GPS receiver module or the like, instead.

The above described embodiments are examples, and various modifications can be made without departing from the scope of the invention.

What is claimed is:

1. A USB electronic device with a power source loaded therein, which is connected to another USB electronic device via a USB connector, comprising:
    a voltage detection unit that detects a voltage at an identification line corresponding to an identification pin of the USB connector;
    a power supply control unit that controls connection/disconnection between a power supply pin of the USB connector and the power source based upon a voltage change at the identification line detected by the voltage detection unit; and
    an allow/disallow control unit that executes control to allow/disallow detection of a voltage change at the identification line, wherein:
    the power supply control unit includes:
        a first switch disposed between the power supply pin and the power source, with which the power supply pin and the power source are connected with each other or disconnected from each other in response to a switching control signal; and
        a second switch with which allow/disallow control is executed with regard to changeover at the first switch based upon the voltage at the identification line detected by the voltage detection unit, wherein:
        when the changeover at the first switch is allowed via the second switch, the switching control signal is applied to the first switch via the second switch, and when the changeover at the first switch is disallowed via the second switch, the switching control signal is interrupted from the first switch by the second switch, and
        the second switch is disposed between a switching control terminal of the first switch and the identification line so as to connect/disconnect the switching control terminal of the first switch to/from the identification line; and
    the allow/disallow control unit includes:
        a pull-up circuit; and
        a switch that connects/disconnects the power source to the identification line via the pull-up circuit, wherein the switch connects the power source to the identification line when the detection of the voltage change is allowed and disconnects the power source from the identification line when detection of the voltage change is disallowed.

2. The electronic device according to claim 1, wherein: the first switch is a semiconductor switching element and the switching control signal is applied to a switching control terminal of the semiconductor switching element, which is turned ON/OFF in correspondence to a voltage level at the identification line.

3. The electronic device according to claim 2, wherein: when the voltage level at the identification line is low, the semiconductor switching element enters an ON state connecting the power supply pin to the power source.

4. The electronic device according to claim 1, wherein: when the changeover at the first switch is allowed by the second switch, the switching control signal is applied to the first switch via the second switch, and when the changeover at the first switch is disallowed by the second switch, the switching control signal is interrupted from the first switch by the second switch.

5. The electronic device according to claim 1, further comprising:
    a setting operation unit with which a user selects a setting to allow/disallow the detection of a voltage change at the identification line.

6. The electronic device according to claim 1, wherein the switch included in the allow/disallow control unit is disposed between the power source and the identification line,
    when the switch is ON, the power source is connected to the identification line via the pull-up circuit and the voltage at the identification line is detected by the voltage detection unit, and
    when the switch is OFF, the power source is not connected to the identification line via the pull-up circuit and the voltage at the identification line is not detected by the voltage detection unit.

7. A USB electronic device with a power source loaded therein, which is connected to another USB electronic device via a USB connector, comprising:
    a voltage detection unit that detects a voltage at an identification line corresponding to an identification pin of the USB connector;
    a power supply control unit that controls connection/disconnection between a power supply pin of the USB connector and the power source based upon a voltage change at the identification line detected by the voltage detection unit; and
    an allow/disallow control unit that executes control to allow/disallow detection of use of another USB electronic device that is connected to the USB electronic device, wherein:
    the power supply control unit includes:
        a first switch disposed between the power supply pin and the power source, with which the power supply pin and the power source are connected with each other or disconnected from each other in response to a switching control signal; and
        a second switch with which allow/disallow control is executed with regard to changeover at the first switch based upon the voltage at the identification line detected by the voltage detection unit, wherein:
        when the changeover at the first switch is allowed via the second switch, the switching control signal is applied to the first switch via the second switch, and when the changeover at the first switch is disallowed via the second switch, the switching control signal is interrupted from the first switch by the second switch, and
        the second switch is disposed between a switching control terminal of the first switch and the identification line so as to connect/disconnect the switching control terminal of the first switch to/from the identification line; and
    the allow/disallow control unit includes:
        a pull-up circuit; and a switch that connects/disconnects the pull-up circuit to/from an identification line, wherein
the switch connects the pull-up circuit to the identification line when the detection of use of the other USB electronic device is allowed and disconnects the pull-up circuit from the identification line when detection of use of the other USB electronic device is disallowed.

* * * * *